US008195626B1

(12) United States Patent
Goodwin (10) Patent No.: US 8,195,626 B1
(45) Date of Patent: Jun. 5, 2012

(54) COMPRESSING TOKEN-BASED FILES FOR TRANSFER AND RECONSTRUCTION

(75) Inventor: Robert L. Goodwin, Mercer Island, WA (US)

(73) Assignee: Amazon Technologies, Inc., Reno, NV (US)

(*) Notice: Subject to any disclaimer, the term of this patent is extended or adjusted under 35 U.S.C. 154(b) by 250 days.

(21) Appl. No.: 12/487,600

(22) Filed: Jun. 18, 2009

(51) Int. Cl.
*G06F 7/00* (2006.01)
*G06F 17/30* (2006.01)

(52) U.S. Cl. .................................. 707/693; 707/758

(58) Field of Classification Search .............. 707/693, 707/999.003, 758
See application file for complete search history.

(56) References Cited

U.S. PATENT DOCUMENTS

| | | | |
|---|---|---|---|
| 4,162,482 A * | 7/1979 | Su | 382/202 |
| 4,574,357 A * | 3/1986 | Pastor et al. | 382/258 |
| 5,523,946 A | 6/1996 | Kaplan et al. | |
| 5,787,386 A | 7/1998 | Kaplan et al. | |
| 5,956,419 A | 9/1999 | Kopec | |
| 6,064,767 A | 5/2000 | Muir et al. | |
| 6,562,077 B2 | 5/2003 | Bobrow et al. | |
| 6,621,941 B1 | 9/2003 | Syeda-Mahmood et al. | |
| 7,272,258 B2 | 9/2007 | Berkner et al. | |
| 2004/0146199 A1 | 7/2004 | Berkner et al. | |
| 2005/0163377 A1* | 7/2005 | Walch | 382/187 |
| 2007/0237401 A1* | 10/2007 | Coath et al. | 382/232 |
| 2008/0037872 A1* | 2/2008 | Lee et al. | 382/173 |
| 2008/0101786 A1* | 5/2008 | Pozniansky et al. | 396/159 |
| 2009/0028443 A1* | 1/2009 | Chen et al. | 382/224 |

FOREIGN PATENT DOCUMENTS

| | | |
|---|---|---|
| JP | 2096885 A | 4/1990 |
| JP | 2004-004302 A | 1/2004 |

OTHER PUBLICATIONS

Skiena, Steven. The Stony Brook Algorithm Repository. http://www.cs.sunysb.edu/~algorith/files/thinning.shtml. Modified Jul. 10, 2008.*

* cited by examiner

*Primary Examiner* — Apu Mofiz
*Assistant Examiner* — Bryan Walker
(74) *Attorney, Agent, or Firm* — Knobbe, Martens, Olson & Bear LLP (57) ABSTRACT

A token-based file may be compressed by applying a medial-axis transformation to the tokens in the file. This generates a topological skeleton of the token that is a thin version of the token, equal distant to its boundaries, i.e., a thinned token. Thinned tokens resulting from the medial-axis transformation are compared with each other and thinned tokens having substantial similar shapes are grouped together. Once the thinned tokens are classified into their respective groups, a representative token of each group is selected for storage along with an assigned token number and the position that each of the corresponding thinned tokens appeared in the work of content. The thinned token-based file may then be transferred to another computing device using less bandwidth than the original token-based file. A page image of the original work can then be reconstructed by the receiving computing device from the thinned token-based file.

29 Claims, 7 Drawing Sheets

COMPRESSING TOKEN-BASED FILES FOR TRANSFER AND RECONSTRUCTION

BACKGROUND

As the use of computers and computer-based networks continues to expand, content providers are preparing and distributing more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more images of pages of content are becoming available electronically. A page image allows a reader to see the page of content as it would appear in print.

Despite the great appeal of providing digital images of content, many content providers face challenges when generating, storing, and transferring the images of content, particularly when the accuracy of recognizing text in images is important. For example, to enable users to read page images from a book or magazine on a computer screen, or to print them for later reading, the images must be sufficiently clear to present legible text. Currently, the images are translated into computer-readable data using various character recognition techniques, such as optical character recognition (OCR), which includes digital character recognition. Although the accuracy of optical character recognition is generally high, some page images, even after undergoing OCR processing, are simply unreadable due to various artifacts. While manual correction is possible, the cost of manually correcting misidentified characters or inserting missing characters is extremely high especially when scanning a large volume of pages.

Another challenge faced by the digital content providers is the cost of storing and transferring images of content. To reduce storage and transfer costs, content providers desire to minimize the size of files used to store and transfer the images. Digital images may be represented at a variety of resolutions, typically denoted by the number of pixels in an image in both the horizontal and vertical directions. Typically, though not always, higher resolution images have a larger file size and require a greater amount of memory for storage and bandwidth for transfer. The cost of storing images of content and/or transferring images of content multiplies when one considers the number of images it takes to capture, store and transfer large volumes of media, such as books, magazines, etc. While reducing the size and resolution of images often reduces the requirement for storing and/or transferring the images, low resolution images eventually reach a point where the images, and particularly any text contained therein, are difficult for readers to perceive when displayed. Content providers wishing to provide page images with text must ensure that the images can be rendered in sufficiently high resolution so that displayed text will be legible.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Generally described, aspects of the present disclosure relate to compressing a token-based file for storage and subsequent transfer to another computing device. In one embodiment, the token-based file has been generated from an electronic (digital) image containing text, which image has been scanned and converted into the token-based file. One example of a suitable method and system for scanning and converting an electronic image into a token-based file for rendering is described in U.S. Pat. No. 7,460,710 entitled "Converting Digital Images Containing Text to Token-Based Files for Rendering," issued Dec. 2, 2008, which patent is incorporated herein by reference in its entirety. Once created, the token-based file may be further compressed by applying a medial-axis transformation to the tokens in the token-based file. This generates a topological skeleton of the token that is a thin version of the token, equal distant to its boundaries, i.e., a thinned token. The thinned tokens resulting from the medial-axis transformation applied to the tokens of the token-based file are compared with each other and thinned tokens having substantial similar shapes are grouped together. Once the thinned tokens are classified into their respective groups, a representative token of each group is selected for storage along with an assigned token number and the position that each of the corresponding thinned tokens appeared in the work of content. The thinned token-based file may then be transferred to another computing device using less bandwidth than the original token-based file. A page image of the original work can then be reconstructed by the receiving computing device from the thinned token-based file.

Figure 1:
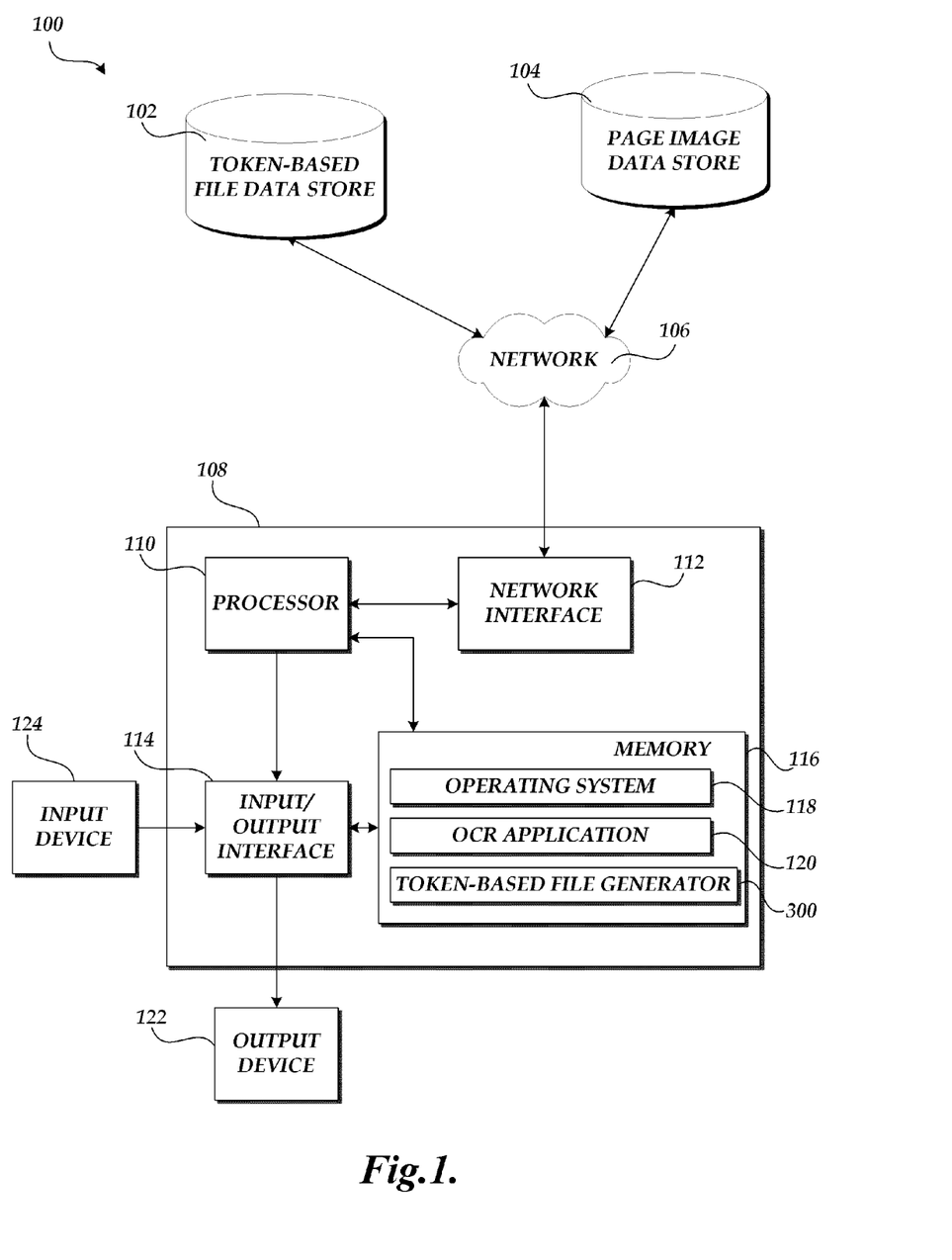
FIG. 1 is a block diagram of an illustrative computing system that may be used to compress token-based files, which compressed file may be transferred to and reconstructed by another computing device.

To provide a context for describing embodiments in the present disclosure, FIG. 1 illustrates an illustrative computing system 100 that may be used to compress token-based files. Those skilled in the art of computers will recognize the wide selection of commercially available components that can be used to construct a system such as the computing system 100 illustrated in FIG. 1. The computing system 100 includes a computing device 108 having a processor 110 in communication with a variety of computing elements, including a network interface 112, an input-output interface 114, and a memory 116. The network interface 112 enables the computing device 108 to communicate data, control signals, data requests, and other information via a communication network 106, such as the Internet or other communication link. Those skilled in the art will appreciate that the network 106 may be any wired network, wireless network or combination thereof. In addition, the network 106 may be a personal area network, local area network, wide area network, cable network, satellite network, cellular telephone network, or combination thereof. Protocols and components for communicating via the Internet or any of the other aforementioned types of communication networks or links are well known to those skilled in the art of computer communications and thus, need not be described in more detail herein.

In one embodiment, the computing device 108 may receive a file containing page images of books, magazines, etc., from a page image database 104 connected to the network 106 via the network interface 112. The computing device 108 may also send token-based files to, and retrieve token-based files from, a token-based file database 102. In the illustrated embodiment, the token-based file data store 102 is remote from the computing device 108 and accessed by the computing device 108 via the network 106. However, those skilled in the art will recognize that in other embodiments the token-based file data store 102 may be local to the computing device 108.

The input-output interface 114 of the computing device 108 enables the computing device 108 to communicate with various local input and output devices. An input device 124, in communication with the input-output interface 114, may include computing elements that provide input signals to the computing device 108, such as a scanner, a scanning pen, a digital camera, a video camera, a copier, a keyboard, a mouse, an external memory, a disk drive, etc. Input devices comprising scanners and cameras, for example, may be used to provide electronic images such as page images including text to the computing device 108, which then converts these electronic images into a token-based file as noted above. In other embodiments, the input devices may be used to provide the computing device 108 with token-based files for further compression.

An output device 122, in communication with the input-output interface 114, may include typical output devices, such as a computer display (e.g., CRT or LCD screen), a television, printer, facsimile machine, copy machine, etc. The output device 122 may also be used to display token-based file images and/or individual tokens for an operator to manually confirm their accuracy and legibility.

The processor 110 is configured to operate in accordance with computer-executable components, such as computer program instructions stored in a computer-readable medium, such as the memory 112. Computer-executable components may also be embodied in a hardware format, such as in a programmed digital signal processor. The memory 116 generally comprises RAM, ROM, and/or permanent memory. The memory 116 may be configured to store digital images of text and/or token-based files for processing, transmission, and display. The memory 116 may also store an operating system 118 for controlling the general operation of the computing device 108. The memory 116 may further store an optical character recognition (OCR) application 120 comprised of program code and data for analyzing digital images containing text therein. Those skilled in the art will recognize that there are a wide variety of algorithms and techniques capable of analyzing and recognizing text in an image. For purposes of the present disclosure, however, it is not necessary that the algorithms and techniques actually recognize the individual characters or symbols as such or interpret their meaning, as achieved by many OCR routines. The memory 116 may additionally store a token-based file generator application 300. The token-based file generator application 300 contains program code and data for converting an electronic image containing text to a token-based file and also for further compressing a token-based file. The compressed token-based file may then be sent to and stored in the token-based file data store 102 for subsequent transfer to another computing device (not shown).

Figure 2:
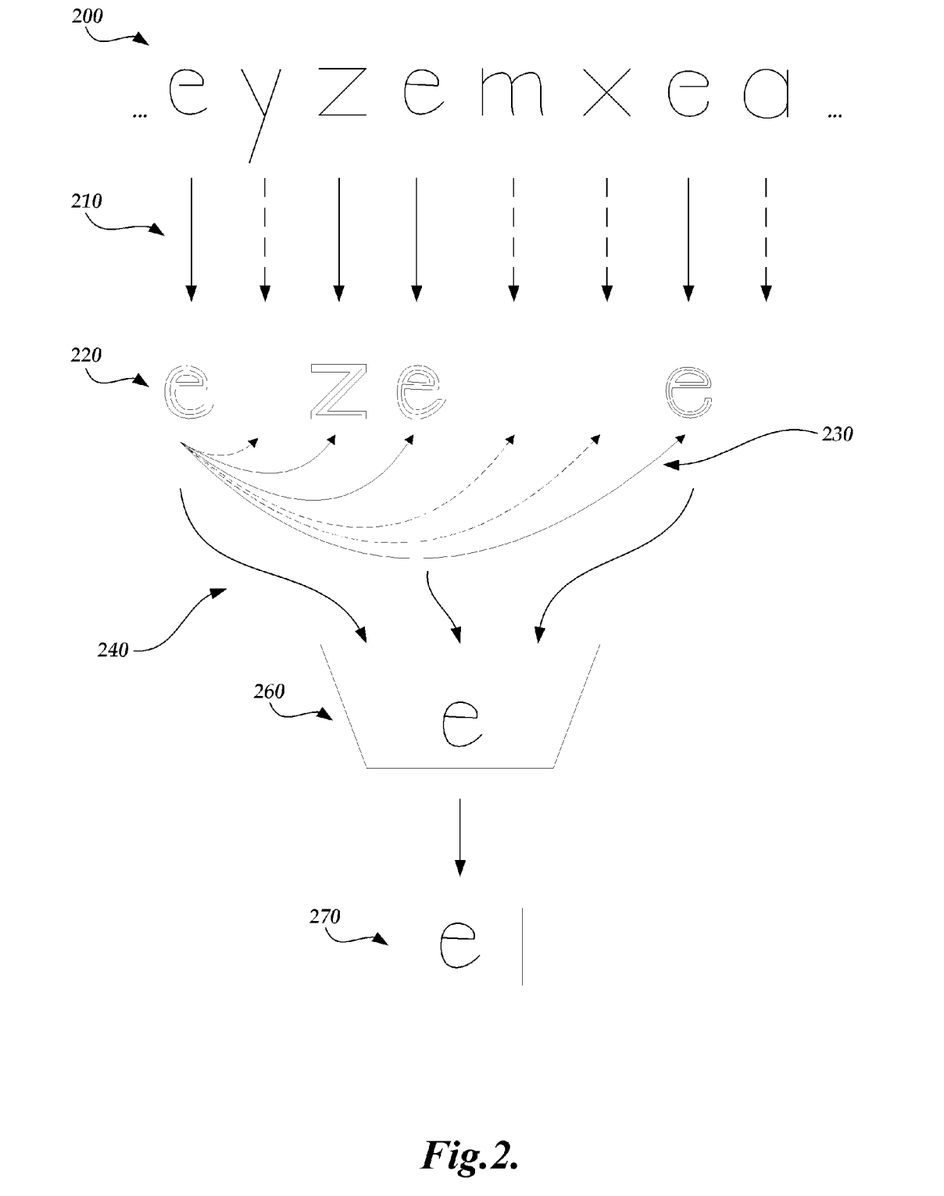
FIG. 2 is a pictorial diagram schematically illustrating an illustrative method for compressing a token-based file.

Referring to FIG. 2, reference number 200, a portion of an illustrative token-based file including the tokens "e," "y," "z," "e," "m," "x," "e," and "a" is depicted. As noted above, the token-based file 200 may have been generated from an image of a work of content containing text that has been scanned and converted into the token-based file. For example, in one embodiment, an electronic image of a work including text is analyzed based on a connective component technique to identify letters, characters, symbols, etc., as separate units, i.e., as tokens. Each of these tokens can be bound with a bounding box for further processing. The connective component technique and/or finding of bounding boxes may be performed using a suitable OCR or OCR-like component stored in memory 116 (FIG. 1) as is well known in the art. In another embodiment, other computational geometry techniques may be used to identify tokens in electronic images. For example, pixels within an electronic image may be represented as a graph having edge weights based on the pixels intensities, and edge magnitudes and directions. A connection determination can be made by determining the shortest path between two sets of pixels. If sets of pixels are sufficiently connected, they may be identified as jointly forming a single token. While it is not critical to identify each letter, character, symbol, etc. as a separate token, it may be desirable to do so for the purpose of reducing the number of token types in order to reduce storage and/or transfer requirements. Accordingly, a token may or may not represent a single letter, character, symbol, etc. and may in some cases represent more than one letter, character, symbol, etc. or only a portion of a letter, character, symbol, etc.

As schematically depicted in FIG. 2, the token-based file 200 is further compressed for subsequent transfer to another computing device. Although the token-based file 200 could be transferred to the other computing device without further compression, it has been determined that that the size of the token-based file 200 can be substantially reduced by further eliminating redundant tokens within the file. Given that the file may be transferred over a communication network such as a mobile telecommunications network, any improvement that can be made to reduce the file size and thus, reduce the use of bandwidth, can significantly increase the time taken to transfer the file.

In the illustrated embodiment, the size of the token-based file is further reduced by first applying a medial-axis transformation to each token in the token-based file. The transformation is generally depicted in FIG. 2 by the solid and phantom arrows generally identified by reference number 210. Although each token in the token-based file 200 is typically transformed, the transformation of only a few tokens is represented in FIG. 2 (with solid arrows) for purposes of brevity in the present disclosure.

A medial-axis transformation method is a method for representing the shape of an object by finding the topological skeleton of the object. The topological skeleton of a shape is a thin version of that shape that is equal distant to its boundaries. The skeleton usually emphasizes geometrical and topological properties of the shape, such as its connectivity, topology, length, direction, and width. Together with the distance of its points to the shape boundary, the skeleton can also serve as a representation of the shape as it contains the necessary information to reconstruct the shape. A medial-axis transform is a complete shape descriptor in that it can be used to reconstruct the shape of the original object. There are many different medial-axis methods for computing skeletons for shapes in digital images. For example, such methods may include using morphological operators, supplementing morphological operators with shape-based pruning, using curve evolution, using level sets, finding ridge points on a distance function, and peeling the shape (without changing the topology)

until convergence. In the case of distance functions, a distance function may be used that returns for each point X inside a shape A, a distance to the closest point on the boundary of A. Using a distance function may be advantageous because its computation is relatively fast. Given that medial-axis transformation methods are well known in the art, they will not disclosed in further detail herein.

Referring again to FIG. 2, applying a medial-axis transformation to each token in the token-based file 200 generates a topological skeleton of the token that is a thin version of the token, equal distant to its boundaries, i.e., a thinned token. The thinned tokens resulting from the medial-axis transformation applied to the tokens of the token-based file 200 are schematically illustrated in FIG. 2 at reference number 220. For purposes of the following description, a thinned token may also be referred to interchangeably herein as a "MAT."

In accordance with the present disclosure, once generated, the thinned tokens are compared with each other and thinned tokens having substantial similar shapes are grouped together. For example, in FIG. 2, three "e" thinned tokens generated from the token-based file 200 are grouped 240 together as having substantially similar shapes into an "e" group 260. As will be discussed in more detail below, the grouping is carried out based on an error in distance between points found on a pair of compared thinned tokens. Thus, if a pair of thinned tokens are sufficiently close, the thinned tokens may be grouped together. For example, an "e" in Times New Roman font and an "e" in Arial font may be treated as having sufficiently different shapes to be classified into two different groups. However, an "e" in Times New Roman font with no interruptions or breaks in its outline and an "e" and Times New Roman font with a break in its outline may be treated as having sufficiently similar shapes to be classified into the same group. Such a point by point comparison to classify thinned tokens is taken so that a resulting token-based file, when reconstructed and displayed, will maintain the overall look and feel of the original electronic image of the work. Accordingly, a single alphanumeric character in the work could be represented by more than one thinned token.

Once the thinned tokens are classified into their respective groups, e.g., group 260, a representative token 270 of each group is selected for storage and subsequent transfer. In one embodiment, the representative, thinned token is stored in a new, further compressed token-based file and the new token-based file of thinned tokens is ultimately transferred to the other computing device. In other embodiments, the representative thinned tokens are stored in the original token-based file and the tokens from which the representative, thinned token is generated are ultimately deleted. It is this compressed token-based file that is transferred to the other computing device.

In one embodiment, the representative, thinned token is a best exemplar of thinned tokens in the group. For example, the best exemplar may be selected based on how many times the corresponding original token appeared in the work of content from which the token-based file was generated. In yet other embodiments, the best exemplar may be selected based on how many "perfect matches" the thinned token had with other thinned tokens to which it was compared. Those skilled in the art will recognize that the best exemplar may be selected in a variety of ways. Thus, the foregoing examples are illustrative and are not to be construed as limiting.

Once the representative thinned token 270 is selected, it may be stored in the token-based file along with an assigned token number and the position that each of the corresponding thinned tokens appeared in the work of content. For example, the position of each thinned token may be defined by a page number and the X-Y coordinate of the position within each page at which the corresponding token appeared. Thus, upon reconstruction, a token reconstructed from the thinned token as opposed to the original token is displayed at this position to thereby create a page image consisting only of reconstructed thinned tokens. Because thinned tokens are ultimately mathematical representations of original token shapes, the tokens reconstructed from them can be rendered at any resolution including high resolution, and appear crisp and legible when displayed. Further, because multiple positions of similarly shaped thinned tokens are merely associated with a pointer to their representative thinned token (having a smaller memory size), there is no need to store the original tokens or all of the thinned tokens for these positions. Therefore, the storage requirement and the bandwidth requirement for the page images can be minimized. For example, a 300 page work of content could have associated with it up to one million different tokens. The creation of the initial token-based file may reduce the number of tokens needed to reconstruct the work to about ten thousand tokens. Using the further compression technique described above, the number of tokens can be further reduced to four thousand tokens. Still further, due to the small size of each thinned token (e.g., 180 bytes), very fast rendering of a compressed token-based file is possible. Still further, the compressed token-based file may be further rendered on any number of print media and/or transferred efficiently and quickly to any number or type of computing device.

Figure 3A:
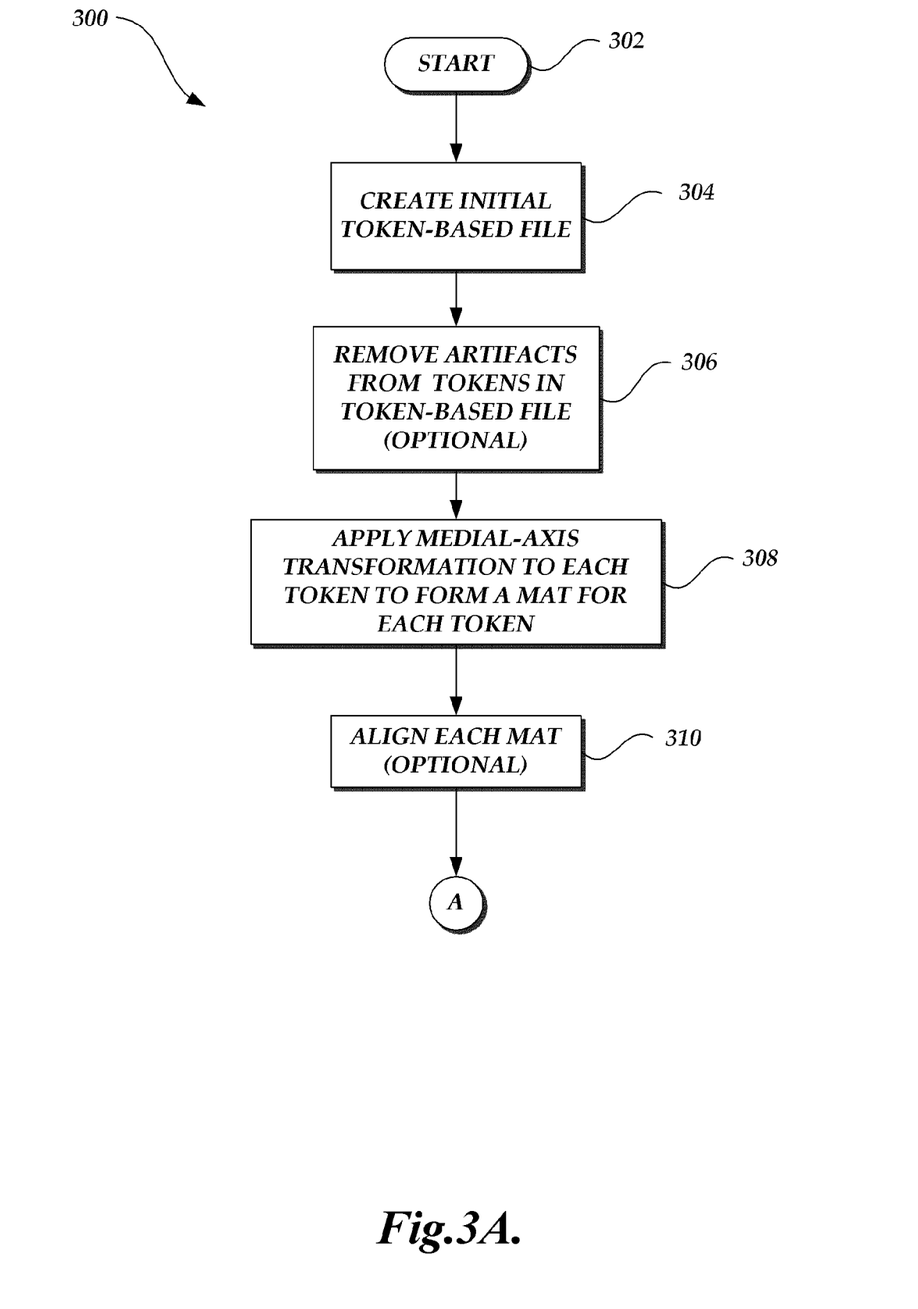
FIGS. 3A-3C are a flow diagram of an illustrative method for compressing a token-based file.
Figure 3B:
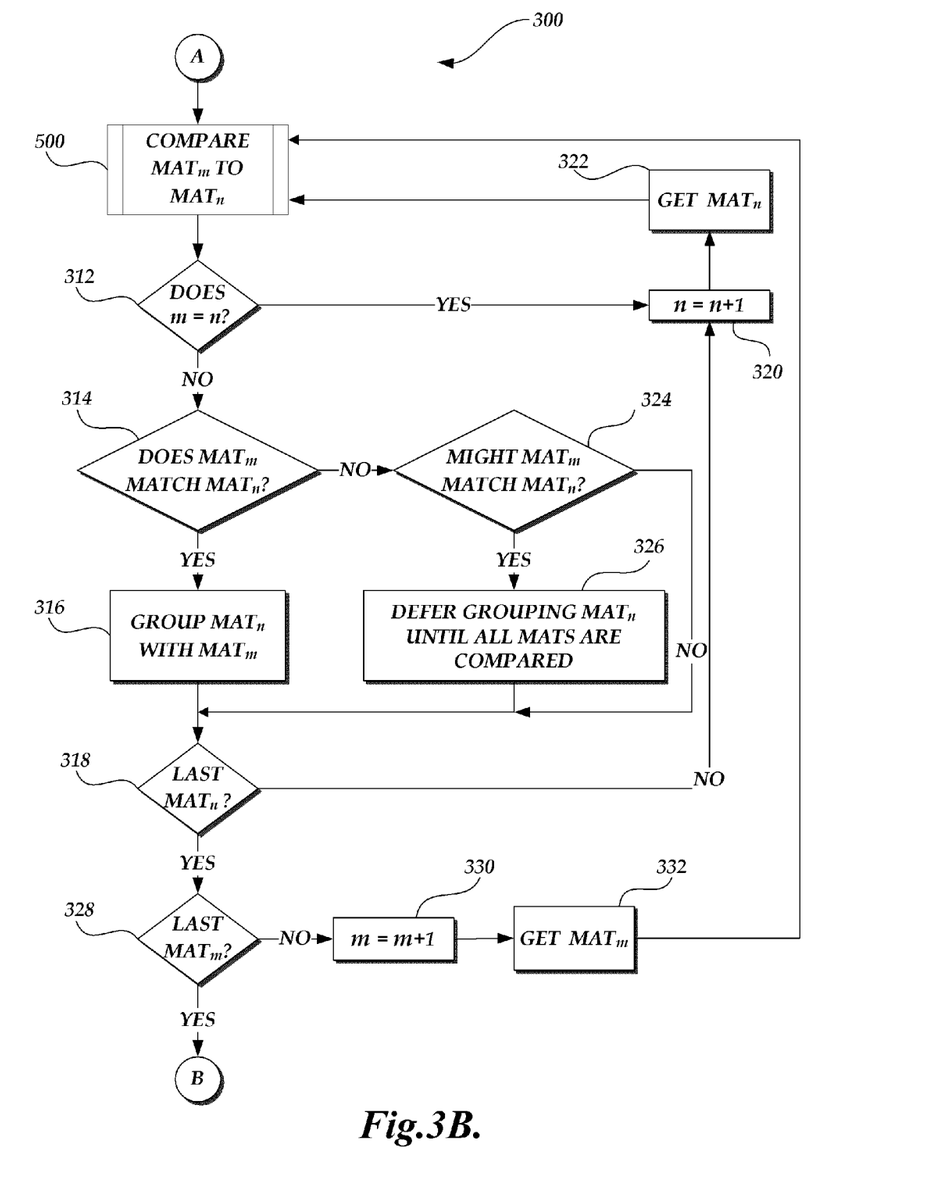
Figure 3C:
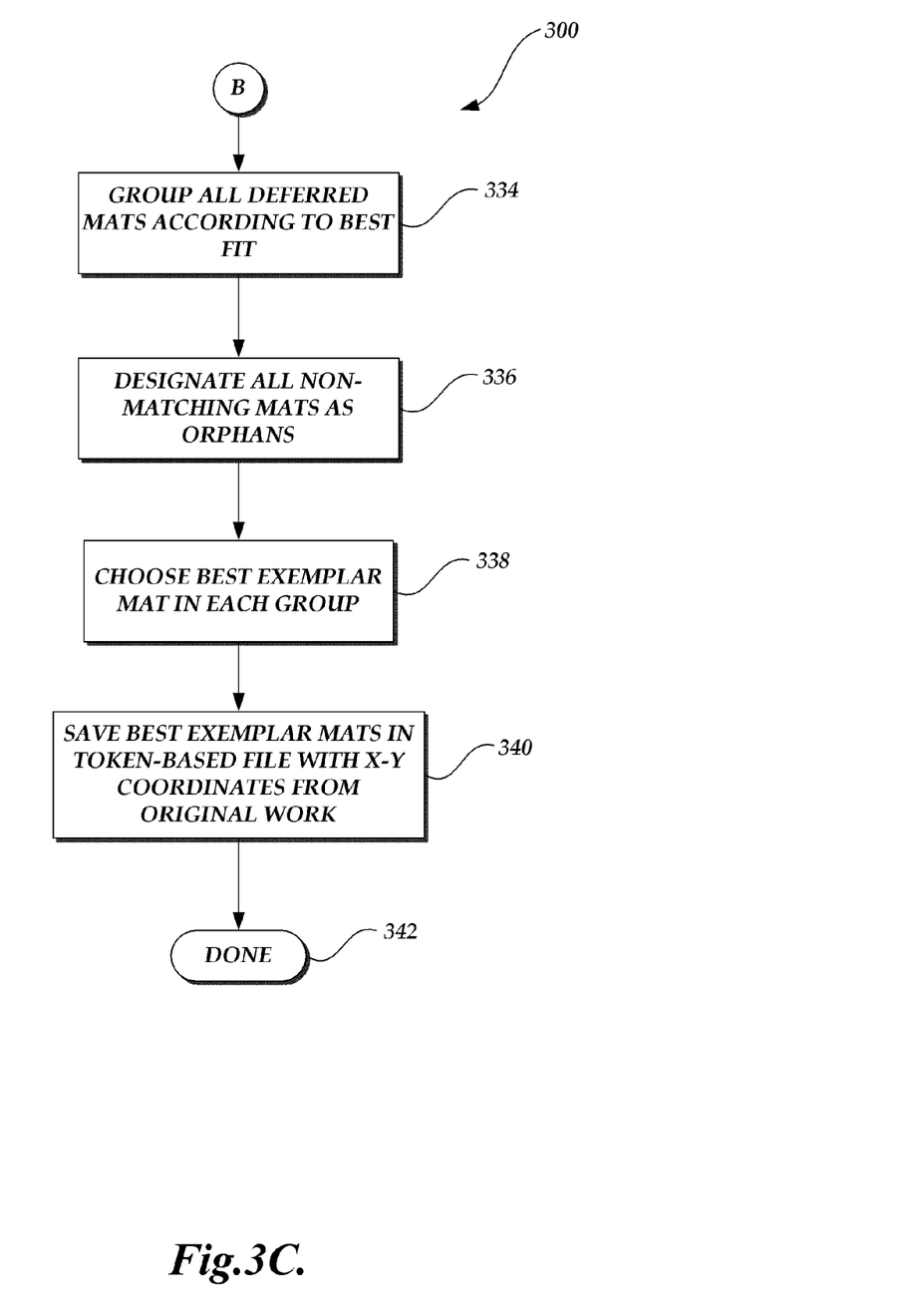

Referring now to FIGS. 3A-3C, an illustrative method for compressing a token-based file as schematically depicted in FIG. 2 is described in more detail. The method 300 begins in a block 302 and proceeds to a block 304 where an initial token-based file for a work of content is created. As noted above, the token-based file may be created from an image of a work of content containing text that has been scanned and converted into the token-based file. Next in a block 306, the tokens in the token-based file can be further processed to remove artifacts or various imperfections that may be present in the token. For example, each token may be retraced to eliminate blurriness and smooth edges of the token. Although removing artifacts from the token at this stage is optional, it has been found to improve the quality of the subsequently generated thinned token.

Next, in a block 308, a medial-axis transformation as described above is applied to each token in the token-based file in order to form a thinned token or "MAT" for each token. As will be described in more detail below, the thinned tokens or MATs are compared to one another and thinned tokens having substantially similar shapes are grouped together. In one embodiment, however, before such a comparison is conducted, each thinned token or MAT is aligned in order to facilitate a one-to-one comparison between thinned tokens. A variety of techniques may be used to align each thinned token. For example, a best estimation technique may be used to determine a position for the thinned token with a least error in distance to a predetermined center point. Using this technique, the thinned token is continuously aligned (e.g., its position is adjusted) through trial and error until the error in distance to the center point reaches a local minimum. In yet another example, a center of mass technique can be used such that a center of mass can be found for each thinned token and then respectively compared with the corresponding center of mass value of the token to which it is being compared.

Figure 4A:
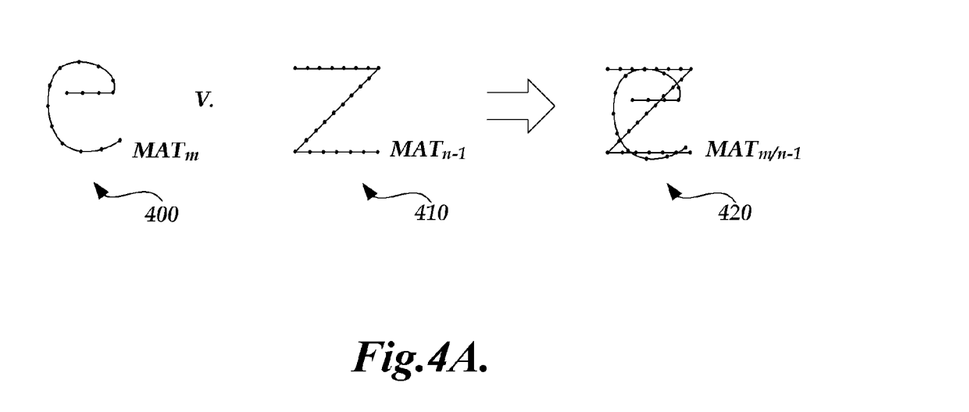
FIGS. 4A and 4B are pictorial diagrams schematically illustrating comparing thinned tokens from a token-based file.
Figure 4B:
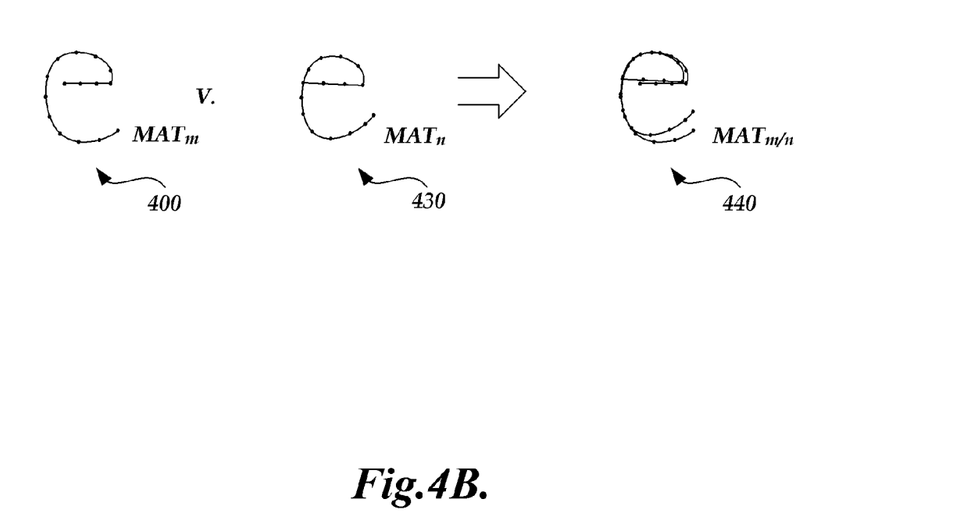

Following alignment of the thinned token, the thinned tokens are compared to one another as depicted in FIG. 3B. More specifically, in a block 500 a thinned token ($MAT_m$) is compared to another thinned token (MAT$_n$). As will be appreciated from FIG. 3B, the thinned token (MAT$_m$) shall be iteratively compared to each other thinned token (MAT$_n$) in the token-based file. As schematically illustrated in FIG. 4, thinned tokens are compared by comparing each point on the thinned token (MAT$_m$) to each point on the other thinned token (MAT$_n$). For example, a thinned token 400 (MAT$_m$) for an "e" may be compared to a thinned token 400 (MAT$_{n-1}$) for a "z" 410 to generate a point-by-point comparison 420 (MAT$_{m/n-1}$). As can be seen from FIG. 4A, thinned token 400 (MAT$_m$) does not have many points in common with thinned token 410 (MAT$_{n-1}$). Accordingly, the thinned token 400 for an "e" would not be grouped with the thinned token 410 for a "z." However, in the next iteration of the method 300, thinned token 400 (MAT$_m$) is compared to the next thinned token 430 in the token-based file (i.e., MAT$_n$) as shown in FIG. 4B. In this example, however, each of the thinned tokens is for an "e." Accordingly, when a point-by-point comparison 440 (MAT$_{m/n}$) is made of thinned token 400 and thinned token 430, it can be seen that a number of points on MAT$_m$ are close to points on MAT$_n$. As a result, thinned token 400 is grouped with thinned token 430.

Figure 5:
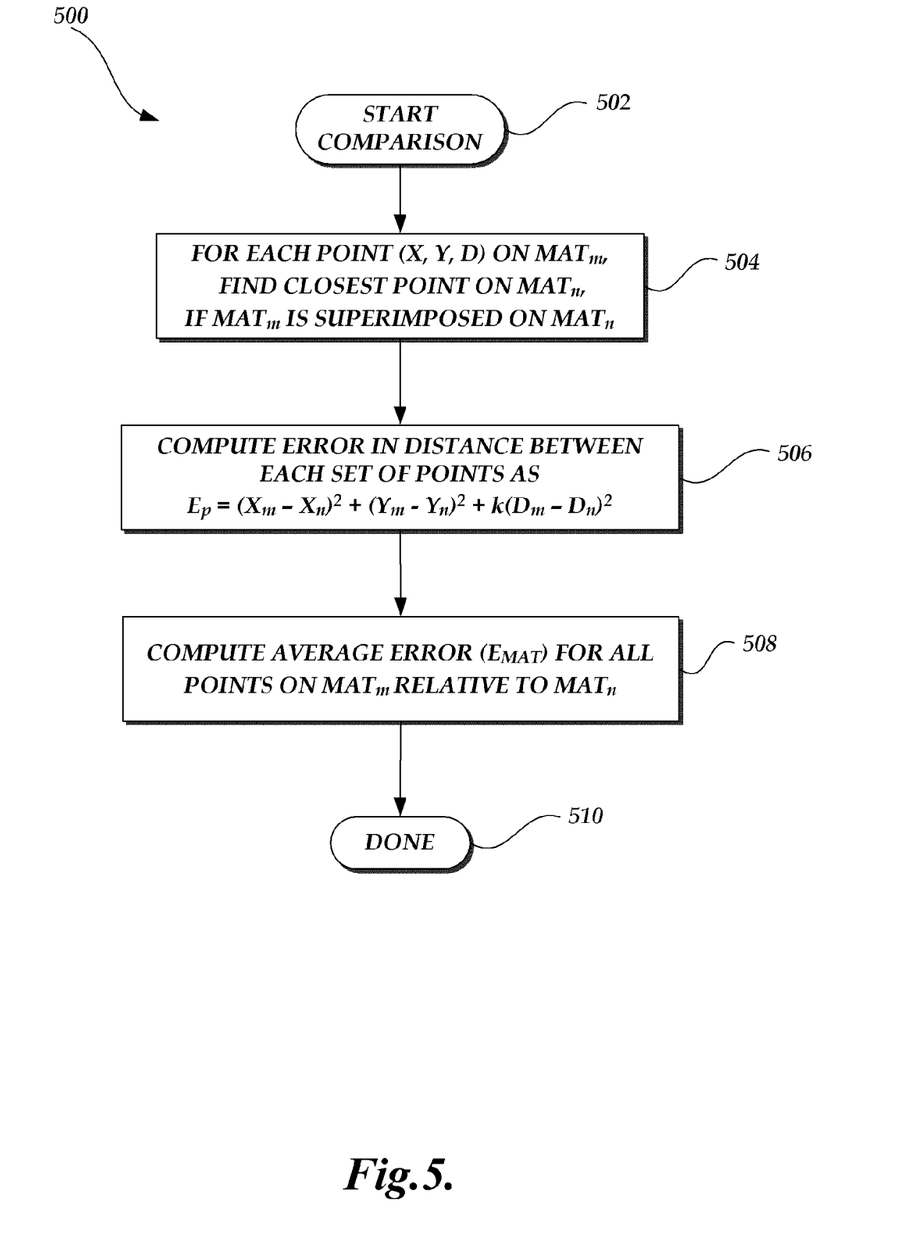
FIG. 5 is a flow diagram of an illustrative method for comparing thinned tokens.

The comparison of MAT$_m$ to MAT$_n$ in block 500 of FIG. 3B is shown in more detail in FIG. 5. The comparison starts in a block 502 and proceeds to a block 504 where, for each point on MAT$_m$ which is defined by an X coordinate, a Y coordinate and a distance (D) from the skeleton of the thinned token to its edge, a closest point on MAT$_n$ (also defined by an X coordinate, a Y coordinate and a distance (D)) is found (as if MAT$_m$ is superimposed on MAT$_n$ as illustratively depicted in FIG. 4). Once the closest point on MAT$_n$ is found for each point on MAT$_m$, an error in distance between each set of such points is computed in block 506 using the following equation:

$$E_p = (X_m - X_n)^2 + (Y_m - Y_n)^2 + k(D_m - D_n)^2 \qquad \text{Equation 1}$$

where k is an empirically determined constant.

In other words, using Equation 1 above, a least squares fit is used to determine the difference in distance between the points of MAT$_m$ and the points of MAT$_n$. Once the error in distance ($E_p$) is determined between each set of points in block 506, the average error ($E_{MAT}$) for all points on MAT$_m$ relative to MAT$_n$ is computed in a block 508. The method 500 then ends in a block 510. The average error for the thinned token MAT$_n$ is used, as described in more detail below, to determine if the other token (MAT$_n$) is substantially similar to or "matches" the thinned token (MAT$_m$) which was compared in block 500 of FIG. 3B.

Returning to FIG. 3B, once the thinned token (MAT$_m$) is compared to another thinned token (MAT$_n$) in the token-based file, the method 300 proceeds to a decision block 312 where it determines if m=n. In other words, the method 300 determines if the thinned tokens being compared in block 500 were, in fact, the same thinned token. If so, the counter n is incremented in a block 320 and the next thinned token (MAT$_n$) in the token-based file is obtained in a block 322. Block 500 is then repeated in order to compare the thinned token (MAT$_m$) to the next thinned token (MAT$_n$) obtained from the token-based file.

If the same thinned token is not being compared as determined in decision block 312, the method 300 proceeds to a decision block 314 where it determines whether thinned token (MAT$_m$) matches thinned token (MAT$_n$). In one embodiment, MAT$_m$ is sufficiently similar to ("matches") MAT$_n$ if the average error for MAT$_m$ relative to MAT$_n$ as computed in, for example, FIG. 5 is less than a threshold value. In some embodiments, the threshold value is empirically determined by trial and error. Accordingly, if the average error ($E_{MAT}$) is less than the threshold, MAT$_n$ is grouped with MAT$_m$ in a block 316. However, if the average error ($E_{MAT}$) is not less than the threshold, it is determined that MAT$_n$ is not an obvious match to MAT$_m$. However, it is possible that MAT$_n$ might match MAT$_m$ better than any other MAT or thinned token to which it is ultimately compared Accordingly, method 300 proceeds from decision block 314 to decision block 324 where it is determined whether MAT$_n$ might match MAT$_m$. In one embodiment, it is determined that MAT$_m$ might match or be sufficiently similar to MAT$_n$ if the average error from MAT$_n$ is greater than a first empirically determined threshold but less than a second empirically determined threshold. In such cases, grouping of MAT$_n$ may be deferred in a block 326 until all the thinned tokens of the token-based file are compared to another. As will be described in more detail below, once all of the thinned tokens of the token-based file are compared to one another, those tokens for which grouping was ultimately deferred following all of the comparisons may eventually be grouped. Returning to decision block 324, if MAT$_n$ is not a possible match to MAT$_m$, MAT$_n$ is simply not grouped and is not marked for possible deferred grouping with MAT$_m$.

Once MAT$_m$ has been compared to MAT$_n$ and grouped with MAT$_m$, marked for possible later grouping or not grouped at all, the method 300 proceeds to a decision block 318 where it determines if MAT$_m$ has been compared to all of the other MATs in the token-based file. If not, the counter n for the other MATs in incremented in a block 320 and the next MAT$_n$ is obtained from the token-based file in block 322. The next MAT$_n$ is then compared to MAT$_m$ in block 500. Accordingly, blocks 312 through 322 are repeated until MAT$_m$ is iteratively compared to every other MAT in the token-based file. Once it is determined in a decision block 318 that MAT$_m$ has been compared to every other thinned token in the token-based file, the method 300 proceeds to a decision block 328 to determine if each thinned token in the token-based file has been compared to each other thinned token in the token-based file. If not, a counter m is incremented in a block 330 and the next MAT$_m$ is obtained in a block 332, so that the next thinned token in the token-based file may be compared to each other thinned token in the token-based file by repeating block 500 and blocks 312-318 as shown in FIG. 3B.

As shown in FIG. 3C, once all of the thinned tokens of the token-based file have been compared to one another, all those thinned tokens deferred from grouping are now grouped with those thinned tokens according to their best fit in a block 334. In other words, if, even after comparing a particular thinned token to every other thinned token in the thinned token file, the thinned token is not grouped and is still marked as possibly matching another token after iteratively comparing the thinned tokens as described above in connection with FIG. 3B, such thinned token may be grouped with a group of thinned tokens to which the average error ($E_{MAT}$) in distance is the smallest. For those thinned tokens which have not been grouped and for which grouping was not deferred, these thinned tokens are stored in the compressed token-based file as orphan thinned tokens and thus, not grouped with any other thinned tokens. The orphan thinned tokens are stored in the compressed token-based file along with position information for the orphan thinned token. Accordingly, when the compressed token-based file is reconstructed, the orphan thinned tokens are displayed at their associated positions. In some embodiments, the deferred thinned tokens are treated as orphan thinned tokens.

Once all of the non-matching or orphan thinned tokens are designated and stored in block 336, a representative, thinned token or "best exemplar" from each group is chosen in a block 338 as described above. Next, in a block 340 the representative, thinned tokens are saved in the compressed token-based file along with an assigned token number, and the position information for the corresponding tokens in the original work. The method then ends in a block 342 with a completed, thinned token, token-based file that may be transferred to another computing device and reconstructed.

All of the processes described herein may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware or a combination thereof.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternative implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for compressing a token-based file to be used in reconstructing a work of content represented by the token-based file, the system comprising:
    a data store that stores at least one token-based file representing a work of content; and
    a computing device in communication with the data store, the computing device configured to:
        obtain a token-based file from the data store;
        apply a medial-axis transformation to each token in the token-based file to transform the token into a thinned token;
        compare each thinned token from the token-based file to each other thinned token from the token-based file, wherein comparing a thinned token from the token-based file to another thinned token from the token-based file comprises, for each point on the thinned token, determining an error in spatial distance between the point on the thinned token and a closest point on the other thinned token;
        based at least in part on the comparison of each thinned token to each other thinned token, classify sufficiently similar thinned tokens into a group to thereby form multiple thinned token groups;
        identify a representative thinned token for each thinned token group; and
        store each representative thinned token in a thinned token file with position data identifying at least one position where the thinned representative token is to appear in a reconstruction of the work.

2. The system of claim 1, wherein the computing device is further configured to:
    for each thinned token from the token-based file compared to another thinned token from the token-based file,
        determine the average error in distance between the points on the thinned token and the closest points on the other thinned token.

3. The system of claim 2, wherein the computing device is configured to:
    for each thinned token from the token-based file compared to the other thinned token from the token-based file,
        classify the other thinned token into a group with the thinned token if the average error in distance between the points on the thinned token and the closest points on the other thinned token is less than a first threshold.

4. The system of claim 3, wherein the computing device is configured to:
    for each thinned token from the token-based file compared to the other thinned token from the token-based file,
        defer classifying the other thinned token into the group with the thinned token if the average error in distance between the points on the thinned token and the closest points on the other thinned token is greater than a first threshold, but less than a second threshold.

5. The system of claim 4, wherein the computing device is configured to:
    once each thinned token from the token-based file has been compared to each other thinned token from the token-based file and for each thinned token for which classification has been deferred,
        classify the other thinned token into a group of thinned tokens based on a smallest average error in distance.

6. The system of claim 4, wherein the computing device is configured to:
    for each thinned token from the token-based file compared to the other thinned token from the token-based file,
        refrain from classifying the other thinned token into the group with the thinned token if the average error in distance between the points on the thinned token and the closest points on the other thinned token is greater than the second threshold.

7. The system of claim 6, wherein the computing device is configured to:
    once each thinned token from the token-based file has been compared to each other thinned token from the token-based file and for each thinned token from which classification has been refrained,
        identify the other thinned token as an orphan in the thinned token file.

8. A method for compressing a token-based file to be used in reconstructing a work of content represented by the token-based file, the method comprising:
    as implemented by one or more computing devices,
        transforming each token in the token-based file into to a thinned token;
        comparing each thinned token from the token-based file to each other thinned token from the token-based file, wherein comparing a thinned token from the token-based file to another thinned token from the token-based file comprises, for each point on the thinned token, determining an error in spatial distance between the point on the thinned token and a closest point on the other thinned token;

based at least in part on the comparison of each thinned token to each other thinned token, classifying thinned tokens into groups, each group including sufficiently similar thinned tokens;

identifying a representative thinned token for each group; and storing each representative thinned token in a thinned token file with position data identifying at least one position where the representative thinned token is to appear in a reconstruction of the work.

9. The method of claim 8, wherein thinned tokens are classified into a group based at least in part on an average error in distance between points on the thinned tokens.

10. The method of claim 8, wherein at least one thinned token not classified into a group is identified as an orphan thinned token, and wherein the orphan thinned token is stored in the thinned token file with position data identifying at least one position where the orphan thinned token is to appear in a reconstruction of the work.

11. The method of claim 8, wherein at least one thinned token not classified into a group is classified into a group with the most similar thinned tokens.

12. The method of claim 8 further comprising identifying the representative thinned token for each group based on how often a corresponding token appeared in the work.

13. The method of claim 8, wherein each token in the token-based file is transformed into a thinned token using a medial-axis transformation.

14. The method of claim 8 further comprising retracing the token prior to transforming the token into a thinned token.

15. The method of claim 8 further comprising aligning the thinned tokens prior to classifying the thinned tokens into groups.

16. The method of claim 15, wherein aligning a thinned token comprises continuously adjusting a position of the thinned token until an error in distance from the thinned token to a predetermined center point reaches a local minimum.

17. A system for compressing a token-based file to be used in reconstructing a work of content represented by the token-based file, the system comprising:

a data store that stores at least one token-based file representing a work of content; and a computing device in communication with the data store, the computing device configured to:

obtain a token-based file from the data store;

transform each token in the token-based file into a thinned token;

compare each thinned token to each other thinned token, wherein comparing a thinned token to another thinned token comprises, for each point on the thinned token, determining an error in spatial distance between the point on the thinned token and a closest point on the other thinned token;

based at least in part on the comparison of each thinned token to each other thinned token, classify thinned tokens into groups, each group including sufficiently similar thinned tokens;

identify a representative thinned token for each group; and store each representative thinned token in the data store with position data identifying at least one position where the thinned representative token is to appear in a reconstruction of the work.

18. The system of claim 17, wherein the computing device is configured to classify thinned tokens into groups by:

for each thinned token from the token-based file, determine the average error in distance between the points on the thinned token and the respective closest points on the other thinned token; and classify the other thinned token into a group with the thinned token if the average error in distance satisfies an error condition.

19. The system of claim 18, wherein the computing device is configured to defer classifying the other thinned token into the group with the thinned token if the average error in distance could possibly satisfy the error condition.

20. The system of claim 17, wherein at least one thinned token not classified into a group is identified as an orphan thinned token, and wherein the orphan thinned token is stored in the data store with position data identifying at least one position where the orphan thinned token is to appear in a reconstruction of the work.

21. The system of claim 17, wherein at least one thinned token not classified into a group is classified into a group with the most similar thinned tokens.

22. The system of claim 17, wherein the computing device is configured to transform each token into a thinned token using a medial-axis transformation.

23. The system of claim 17, wherein the computing device is configured to retrace each token prior to transforming each token into a thinned token.

24. The system of claim 17, wherein a thinned token comprises a skeleton and data used for reconstructing a shape for the token.

25. A computer-readable medium having a computer-executable component for reducing a token-based file to be used in reconstructing a work of content represented by the token-based file, the computer-executable component comprising:

a token-based file generator component configured to:

transform each token in the token-based file into to a thinned token;

compare each thinned token to each other thinned token, wherein comparing a thinned token to another thinned token comprises, for each point on the thinned token, determining an error in spatial distance between the point on the thinned token and a closest point on the other thinned token;

based at least in part on the comparison of each thinned token to each other thinned token, classify thinned tokens into groups, each group including sufficiently similar thinned tokens;

identify a representative thinned token for each group; and store each representative thinned token in a thinned token file with position data identifying at least one position where the representative thinned token is to appear in a reconstruction of the work.

26. The computer-readable medium of claim 25, wherein thinned tokens are classified into a group based at least in part on an average error in distance between the thinned tokens.

27. The computer-readable medium of claim 25, wherein at least one thinned token not classified into a group is identified as an orphan thinned token, and wherein the orphan thinned token is stored in the thinned token file with position data identifying at least one position where the orphan thinned token is to appear in a reconstruction of the work.

28. The computer-readable medium of claim 25, wherein at least one thinned token not classified into a group is classified into a group with the most similar thinned tokens.

29. The computer-readable medium of claim 25, wherein each token in the token-based file is transformed into a thinned token using a medial-axis transformation.

* * * * *